(12) United States Patent
Morimoto (10) Patent No.: US 7,509,884 B2
(45) Date of Patent: Mar. 31, 2009

(54) SENSOR SHEET

(75) Inventor: Hideo Morimoto, Yamatokoriyama (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 12/010,621

(22) Filed: Jan. 28, 2008

(65) Prior Publication Data

US 2008/0184820 A1    Aug. 7, 2008

(30) Foreign Application Priority Data

Feb. 1, 2007    (JP)    ............................. 2007-023247
Apr. 16, 2007    (JP)    ............................. 2007-107529

(51) Int. Cl.
    *G01L 1/04*      (2006.01)
(52) U.S. Cl. ................................................ 73/862.628
(58) Field of Classification Search ...............................
                                    73/862.391–862.642
See application file for complete search history.

(56) References Cited

U.S. PATENT DOCUMENTS

| | | | | |
|---|---|---|---|---|
| 4,348,611 A * | 9/1982 | Ruppel et al. | ................ | 313/388 |
| 4,734,034 A | 3/1988 | Maness et al. | | |
| 4,856,993 A | 8/1989 | Maness et al. | | |
| 5,055,838 A * | 10/1991 | Wise et al. | ............. | 340/870.37 |
| 5,150,011 A * | 9/1992 | Fujieda | .................... | 315/169.4 |
| 5,872,425 A * | 2/1999 | Shino et al. | ................. | 313/582 |
| 5,942,733 A | 8/1999 | Allen et al. | | |
| 6,373,265 B1 | 4/2002 | Morimoto et al. | | |
| 6,826,968 B2 * | 12/2004 | Manaresi et al. | ....... | 73/862.046 |

FOREIGN PATENT DOCUMENTS

| | | |
|---|---|---|
| EP | 0 538 899 A2 | 4/1993 |
| GB | 2 264 383 A | 8/1993 |
| JP | A-58-189730 | 4/1982 |
| JP | A-61-240101 | 4/1985 |
| JP | A 2004-117042 | 4/2004 |

* cited by examiner

*Primary Examiner*—Max Noori
(74) *Attorney, Agent, or Firm*—Oliff & Berridge, PLC (57) ABSTRACT

In a sensor sheet, first electrodes (11) each covered with a pressure-sensitive resistive member and second electrodes (21) each covered with a pressure-sensitive resistive member are disposed to extend perpendicularly to each other in a plan view. A core member (40) made of a hard material is disposed over four detection regions where the first electrodes (11) and the second electrodes (21) overlap each other in a plan view. X-, Y-, and Z-axial components (Fx, Fy, Fz) of a force (F) externally applied to the sensor sheet (1) are detected on the basis of changes in the contact resistance values (R1, R2, R3, R4) corresponding the four detection regions over which one core member (40) is disposed.

20 Claims, 9 Drawing Sheets

SENSOR SHEET

BACKGROUND OF THE INVENTION

1. Field of the Invention

The present invention relates to a sensor sheet capable of measuring the distribution of forces externally applied.

2. Description of Related Art

U.S. Pat. No. 4,734,034 and U.S. Pat. No. 4,856,993 disclose a sensor sheet in which a polyethylene terephthalate (PET) film on which vertical stripes are printed with pressure-sensitive resistive ink and another PET film on which horizontal stripes, that is, perpendicular to the vertical stripes, are printed with pressure-sensitive resistive ink are attached to each other so that the pressure-sensitive resistive ink stripes printed on the respective films intersect with each other. In this sensor sheet, a force externally applied changes the contact resistance between the two PET film at the portion to which the force has been applied. Therefore, by detecting changes in contact resistance along the respective pressure-sensitive resistive ink stripes, the distribution of externally applied forces, that is, pressures, can be measured.

However, the above-described sensor sheet can detect only the component of the externally applied force perpendicular to the sheet, but can not detect the other directional components. That is, even when forces are applied obliquely, that is, not perpendicularly, to the sensor sheet, the sheet can only measure the distribution of forces like a case in which forces corresponding to the components of the oblique forces perpendicular to the sheet are applied to the sheet. Thus, this sensor sheet can not perform detailed analysis of the distribution of forces externally applied.

For the above reason, the applicant of the present application has proposed in Japanese Patent Unexamined Publication No. 2004-117042 a sensor sheet capable of detecting different directional components of externally applied forces. This sensor sheet includes a number of sensor cells arranged in a matrix. Each sensor cell has electrodes corresponding to X-, Y-, and Z-axes. A force externally applied changes the contact resistance of pressure-sensitive resistive ink disposed between the electrodes corresponding to each axis. Thus, by detecting a change in the resistance value, the sensor sheet can detect the X-, Y-, and Z-axial components of the externally applied force.

The above-described sensor sheet can detect the X-, Y-, and Z-axial components of each force externally applied, however, it has various problems as follows. First, because each sensor cell has a number of electrodes corresponding to different axes, this makes it difficult to miniaturize the sensor sheet. In particular, when a number of sensor cells are disposed close to each other, this makes it very difficult to extend out lead wires from all electrodes. In addition, each sensor cell is complex in construction, and this causes very bad efficiency for increasing the density of the sensor cells. Further, when pressure detected by each sensor cell is converted into a voltage proportional to the magnitude of the pressure, an R/V converter is required to convert resistance into voltage in one-to-one proportion for any contact resistance. This makes the converting circuit large-scale.

The above-described problems apply to not only a sensor sheet in which forces are detected on the basis of changes in the contact resistance of pressure-sensitive resistive ink between electrodes, but also a sensor sheet in which forces are detected on the basis of changes in the capacitance of capacitors between electrodes.

SUMMARY OF THE INVENTION

An object of the present invention is to provide a sensor sheet capable of detecting different directional components of externally applied forces with a simple construction.

According to a first aspect of the present invention, a sensor sheet comprises a plurality of first stripe electrodes disposed so as to be distant from each other; and a plurality of second stripe electrodes disposed so as to be distant from each other and intersect with the plurality of first electrodes in a plan view. The plurality of second electrodes are displaceable toward the plurality of first electrodes by a force externally applied. The sheet further comprises a plurality of pressure-sensitive resistive elements disposed between the plurality of first electrodes and the plurality of second electrodes at detection regions where the first and second electrodes overlap each other in a plan view; and a core member made of a hard material and disposed on the opposite side of the plurality of second electrodes from the plurality of first electrodes so as to be over a plurality of detection regions in a plan view. The sheet detects different directional components of an externally applied force on the basis of changes in the resistance values between portions of the first and second electrodes corresponding to the plurality of detection regions.

According to a second aspect of the present invention, a sensor sheet comprises a plurality of first stripe electrodes disposed so as to be distant from each other; and a plurality of second stripe electrodes disposed so as to be distant from each other and intersect with the plurality of first electrodes in a plan view. The plurality of second electrodes are displaceable toward the plurality of first electrodes by a force externally applied. The sheet further comprises a core member made of a hard material and disposed on the opposite side of the plurality of second electrodes from the plurality of first electrodes so as to be over a plurality of detection regions where the first and second electrodes overlap each other in a plan view. The plurality of first electrodes are electrically insulated from the plurality of second electrodes. The sheet detects different directional components of an externally applied force on the basis of changes in the capacitance values between portions of the first and second electrodes corresponding to the plurality of detection regions.

According to the invention, the different directional components of the externally applied force can be detected with a relatively small number of first electrodes and a relatively small number of second electrodes. This simplifies the construction of the sensor sheet, and makes it easy to extend out a lead wire from each electrode. Therefore, without requiring a complicated manufacturing process, the sensor sheet can be obtained that can detect the different directional components of the externally applied force.

In the present invention, four detection regions may be disposed symmetrically with respect to two straight lines extending perpendicularly to each other in a plan view.

According to the above feature of the invention, the different directional components of the externally applied force are detected on the basis of changes in resistance value corresponding to the four detection regions. This simplifies the calculation for detecting the components.

In the present invention, the center of the core member may coincide with the center of the four detection regions in a plan view.

According to the above feature of the invention, because the center of the core member coincides with the center of the four detection regions in the plan view, the force externally applied to the sensor sheet can accurately be detected.

In the present invention, at least part of an end portion of the core member may be inside any of the four detection regions in a plan view.

According to the above feature of the invention, each second electrode is pressed by the lower face of the core member at an edge portion of the core member where externally applied forces concentrate, so that the second electrode is moved toward the first electrodes. This improves the sensitivity of detecting the externally applied forces.

In the present invention, the core member may be columnar.

According to the above feature of the invention, the core member can move or incline evenly in any direction by an external force. This suppresses directionality of the force detection.

In the present invention, five detection regions may be disposed symmetrically with respect to two straight lines extending perpendicularly to each other in a plan view.

According to the above feature of the invention, the different directional components of the externally applied force are detected on the basis of changes in resistance value corresponding to the five detection regions. This simplifies the calculation for detecting the components.

In the present invention, the center of the core member may coincide with the center of the five detection regions in a plan view.

According to the above feature of the invention, because the center of the core member coincides with the center of the five detection regions in the plan view, the force externally applied to the sensor sheet can accurately be detected.

In the present invention, at least part of an end portion of the core member may be inside any of four outer detection regions of the five detection regions in a plan view.

According to the above feature of the invention, each second electrode is pressed by the lower face of the core member at an edge portion of the core member where externally applied forces concentrate, so that the second electrode is moved toward the first electrodes. This improves the sensitivity of detecting the externally applied forces.

In the present invention, the core member may be columnar.

According to the above feature of the invention, the core member can move or incline evenly in any direction by an external force. This suppresses directionality of the force detection.

In the present invention, units each including the plurality of detection regions and the core member may be arranged in a matrix.

According to the above feature of the invention, the units each including the plurality of detection regions and the core member are uniformly arranged on the sensor sheet. This makes it possible to detect the distribution of forces externally applied to the sensor sheet.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
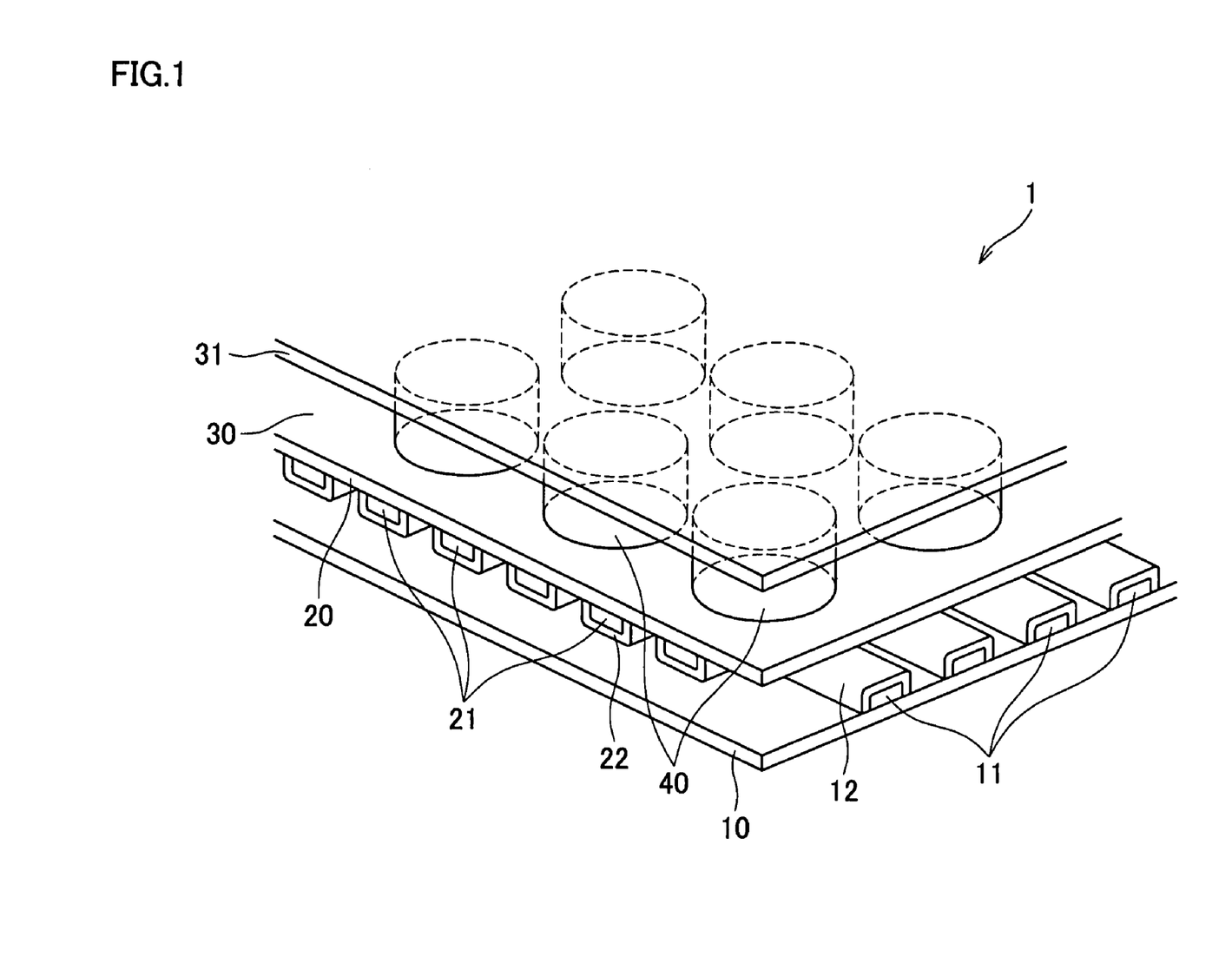
FIG. 1 is a partial external perspective view of a sensor sheet according to a first embodiment of the present invention.
Figure 2:
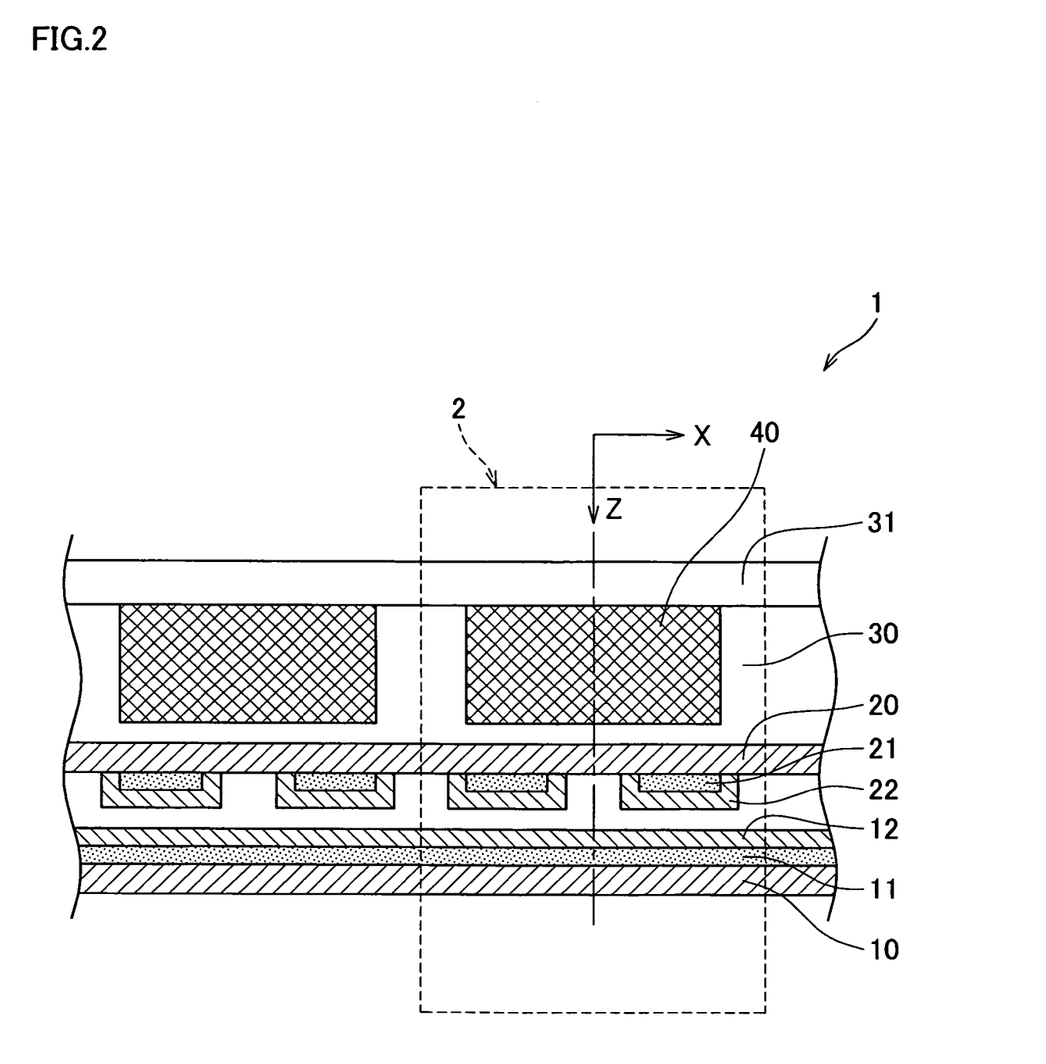
FIG. 2 is a schematic sectional view showing a general construction of the sensor sheet of FIG. 1.
Figure 3:
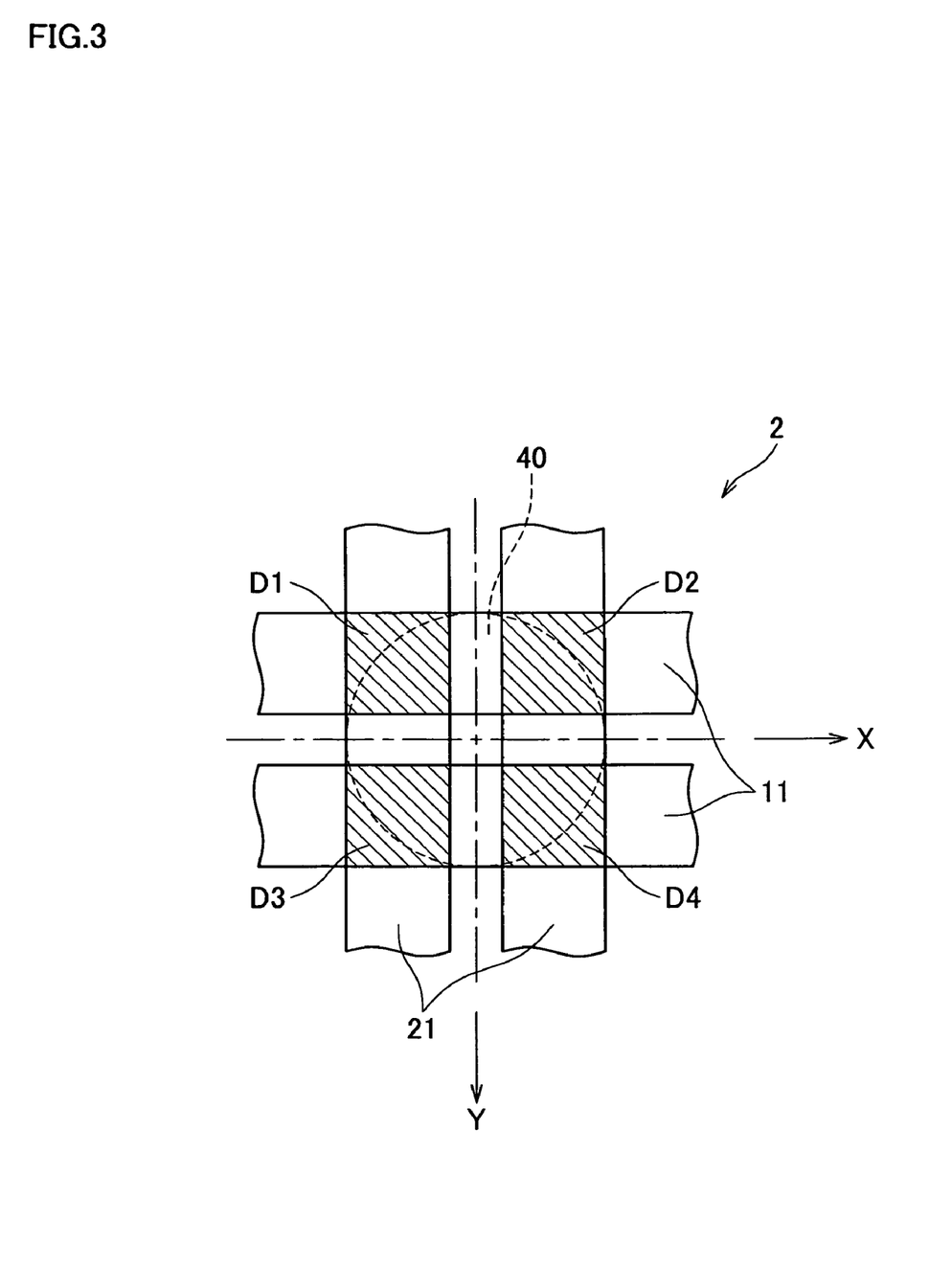
FIG. 3 shows the arrangement of detection regions in the sensor sheet.
Figure 4:
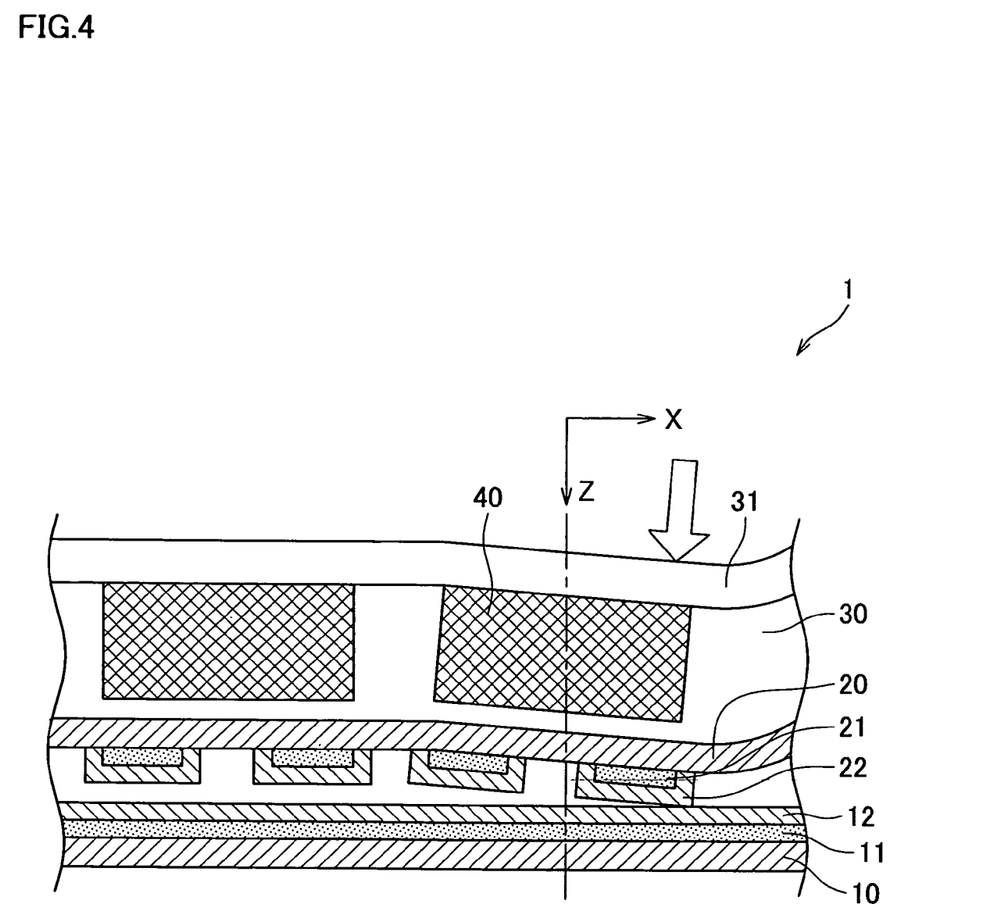
FIG. 4 is a schematic sectional view showing the general construction of the sensor sheet when a force is externally applied.

Hereinafter, preferred embodiments of the present invention will be described with reference to the accompanying drawings. FIG. 1 is a partial external perspective view of a sensor sheet according to a first embodiment of the present invention. FIG. 2 is a schematic sectional view showing a general construction of the sensor sheet of FIG. 1. FIG. 3 shows the arrangement of detection regions in the sensor sheet. FIG. 4 is a schematic sectional view showing the general construction of the sensor sheet when a force is externally applied.

As shown in FIGS. 1 and 2, the sensor sheet 1 includes a substrate 10 on which first stripe electrodes 11 are disposed, and a substrate 20 on which second stripe electrodes 21 are disposed. The substrate 20 is attached to the substrate 10. The sensor sheet 1 further includes a supporting member 30 and a number of columnar core members 40 both disposed above the substrate 20, and a flat uneven cover layer 31 that receives forces externally applied. Each of the first electrodes 11 formed on the upper face of the substrate 10 is covered with a pressure-sensitive resistive member 12. Each of the second electrodes 21 formed on the lower face of the substrate 20 is covered with a pressure-sensitive resistive member 22.

The first electrodes 11 are disposed on the upper face of the substrate 10 so as to be distant and insulated from each other. Likewise, the second electrodes 21 are disposed on the lower face of the substrate 20 so as to be distant and insulated from each other. The substrates 10 and 20 are attached to each other so that the first and second electrodes 11 and 21 are opposed to each other in a state in which the first and second electrodes 11 and 21 extend perpendicularly to each other in a plan view.

Each of the substrate 10 and 20 is made of a flexible material such as polyethylene terephthalate (PET) or polyimide. Each of the first and second electrodes 11 and 21 is made of a conductive material such as silver, aluminum, copper, or carbon. Each of the pressure-sensitive resistive members 12 and 22 is made of, for example, pressure-sensitive conductive ink or pressure-sensitive conductive rubber. Each of the supporting member 30 and the cover layer 31 is made of a flexible material such as silicone rubber, urethane rubber, or sponge. Each of the core members 40 is made of a material harder than the supporting member 30 and the cover layer 31. The sensitivity of the sensor sheet 1 can be controlled by changing the ingredients of the pressure-sensitive resistive members 12 and 22, or the material, hardness, or thickness of each of the supporting member 30 and the cover layer 31. In a modification, the supporting member 30 and the cover layer 31 may be made into a single body.

In the sensor sheet 1, each portion where a first electrode 11 and a second electrode 21 overlap each other in a plan view serves as a detection region. One lead wire is connected to each first electrode 11. A common drive voltage is supplied to the first electrodes 11 through the respective lead wires. On the other hand, one lead wire is connected to each second electrode 21. The lead wire is connected to the input terminal of an operational (OP) amplifier. Therefore, the detection regions disposed on one first electrode 11 serve as a common drive electrode. The second electrodes 21 corresponding to the respective detection regions are connected to separate operational amplifiers. Thus, the contact resistance values between the portions corresponding to the detection regions of the first and second electrodes 11 and 21 can be detected.

In the sensor sheet 1, as shown in FIG. 3, a construction including four detection regions D1, D2, D3, and D4 and a core member 40 corresponding to the regions serves as one base unit 2. In the sensor sheet 1, a number of base units 2 are arranged in a matrix. Here, an X-axis is defined extending along a first electrode 11 in a plan view; a Y-axis is defined extending along a second electrode 21 in the plan view; and a Z-axis is defined extending perpendicularly to the substrate 10. In this coordinate system, four detection regions D1, D2, D3, and D4 are arranged symmetrically with respect to the orthogonal X- and Y-axes in the plan view.

As shown in FIG. 3, the core member 40 corresponding to the four detection regions D1, D2, D3, and D4 is disposed over the four detection regions D1, D2, D3, and D4. The center of the core member 40 coincides with the center of the four detection regions D1, D2, D3, and D4 in the plan view. At least part of the end portion of the core member 40 is inside all of the four detection regions D1, D2, D3, and D4 in the plan view.

Therefore, when an external force is applied to the sensor sheet 1, the X-, Y-, and Z-axial components of the external force can be detected on the basis of changes in the contact resistance values R1, R2, R3, and R4 between the first and second electrodes 11 and 21 corresponding to the respective detection regions D1, D2, D3, and D4 included in each base unit 2.

Next, a method of detecting the X-, Y-, and Z-axial components of an externally applied force will be specifically described. In this embodiment, the contact resistance values R1, R2, R3, and R4 corresponding to the respective detection regions D1, D2, D3, and D4 are converted into voltages V1, V2, V3, and V4 inversely proportional to the magnitudes of external forces.

For example, as shown in FIG. 4, when an X-axial positive force Fx, that is, biased in the X-axial positive direction, is applied to the cover layer 31, strong forces are applied to portions corresponding to the detection regions D2 and D4. Therefore, in accordance with the magnitude of the force Fx, the contact resistance values R2 and R4 decrease to increase the voltages V2 and V4. At this time, because forces are scarcely applied to portions corresponding to the detection regions D1 and D3, the contact resistance values R1 and R3 scarcely change and thus the voltages V1 and V3 also scarcely change.

Likewise, when a Y-axial positive force Fy, that is, biased in the Y-axial positive direction, is applied to the cover layer 31, strong forces are applied to portions corresponding to the detection regions D3 and D4. Therefore, in accordance with the magnitude of the force Fy, the contact resistance values R3 and R4 decrease to increase the voltages V3 and V4.

On the other hand, when a Z-axial positive force Fz is applied to the cover layer 31, forces are evenly applied to portions corresponding to the detection regions D1, D2, D3, and D4. Therefore, in accordance with the magnitude of the force Fz, any of the contact resistance values R1, R2, R3, and R4 decreases to increase any of the voltages V1, V2, V3, and V4.

The following Table 1 shows the above-described relations between the X-, Y-, and Z-axial forces Fx, Fy, and Fz and the voltages V1, V2, V3, and V4.

TABLE 1

| Force | V1 | V2 | V3 | V4 |
|---|---|---|---|---|
| Fx |  | + |  | + |
| Fy |  |  | + | + |
| Fz | + | + | + | + |

In Table 1, symbol "+" indicates that each voltage increases from the value of the state in which no external force is applied to the sensor sheet 1. No symbol indicates that the voltage scarcely changes.

From the above relations, the X-, Y-, and Z-axial components Fx, Fy, and Fz of a force F applied to the cover layer 31 are given by the following expressions using the voltages V1, V2, V3, and V4.

$$Fx=(V2+V4)-(V1+V3)$$

$$Fy=(V3+V4)-(V1+V2)$$

$$Fz=V1+V2+V3+V4$$

As described above, in the sensor sheet 1 of this embodiment, the X-axial component Fx, Y-axial component Fy, and Z-axial component Fz of a force F externally applied to the sensor sheet 1 can be detected by using the voltages V1, V2, V3, and V4 derived from the contact resistance values R1, R2, R3, and R4 respectively corresponding to four detection regions over which one core member 40 is disposed.

In a modification, the contact resistance values R1, R2, R3, and R4 may be directly detected. In this modification, by using them and performing similar calculations to those described above, the X-, Y-, and Z-axial components Fx, Fy, and Fz of the force F can be obtained. In another modification, the voltages V1, V2, V3, and V4 may be once converted into digital values by using an A/D converter or the like. In this modification, by using the digital values and performing similar calculations to those described above, the X-, Y-, and Z-axial components Fx, Fy, and Fz of the force F can be obtained.

Figure 5:
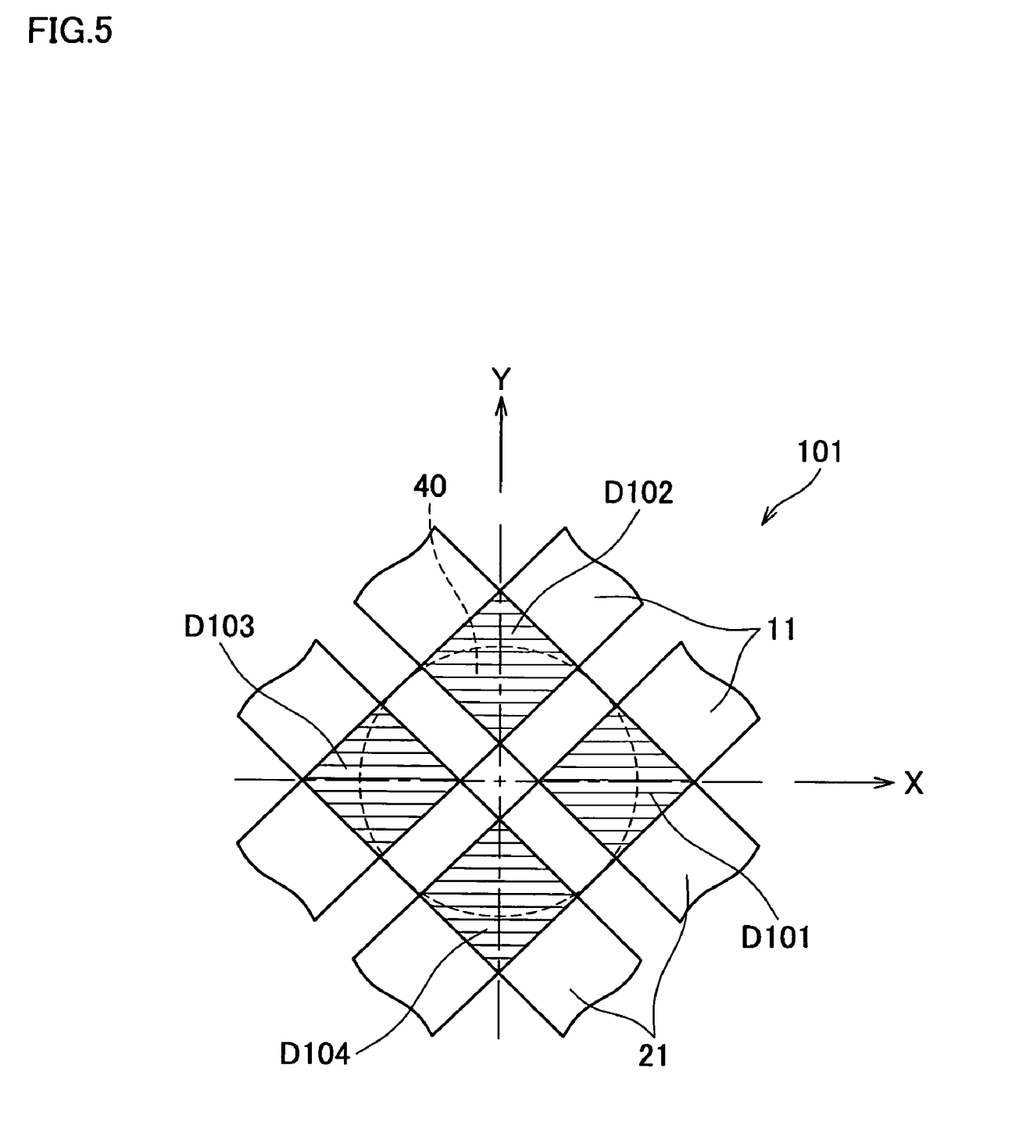
FIG. 5 shows the arrangement of detection regions in a sensor sheet according to a second embodiment of the present invention.

Next, a sensor sheet 101 according to a second embodiment of the present invention will be described with reference to FIG. 5. FIG. 5 shows the arrangement of detection regions in the sensor sheet according to the second embodiment of the present invention.

The sensor sheet 101 of this embodiment differs from the sensor sheet 1 of the first embodiment on the following point. In the case of the sensor sheet 1, the X-axis is defined extending along a first electrode 11 in a plan view; the Y-axis is defined extending along a second electrode 21 in the plan view; and the Z-axis is defined extending perpendicularly to the substrate 10. In the case of the sensor sheet 101, however, the X- and Y-axes are defined extending so as to intersect with the first and second electrodes 11 and 22. The other features of the construction of the sensor sheet 101 are the same as those of the sensor sheet 1. Therefore, the same components of the sensor sheet 101 as those of the sensor sheet 1 are denoted by the same reference numerals as those of the sensor sheet 1, respectively, and detailed description thereof will be omitted.

In the sensor sheet 101, the X-axis is defined extending with being rotated at 45 degrees clockwise from each first electrode 11 in a plan view; the Y-axis is defined extending with being rotated at 45 degrees clockwise from each second electrode 21 in the plan view; and the Z-axis is defined extending perpendicularly to the substrate 10. In this coordinate system, four detection regions D101, D102, D103, and D104 are arranged symmetrically with respect to the orthogonal X- and Y-axes in the plan view.

As shown in FIG. 5, the core member 40 corresponding to the four detection regions D101, D102, D103, and D104 is disposed over the four detection regions D101, D102, D103, and D104. The center of the core member 40 coincides with the center of the four detection regions D101, D102, D103, and D104 in the plan view. Part of the end portion of the core member 40 is inside all of the four detection regions D101, D102, D103, and D104 in the plan view.

Therefore, when an external force is applied to the sensor sheet 101, the X-, Y-, and Z-axial components of the external force can be detected on the basis of changes in the contact resistance values R101, R102, R103, and R104 between the first and second electrodes 11 and 21 corresponding to the respective detection regions D101, D102, D103, and D104.

In this embodiment, the contact resistance values R101, R102, R103, and R104 corresponding to the respective detection regions D101, D102, D103, and D104 are converted into voltages V101, V102, V103, and V104 inversely proportional to the magnitudes of external forces. In this case, the X-, Y-, and Z-axial components Fx, Fy, and Fz of a force F applied to the cover layer 31 are given by the following expressions using the voltages V101, V102, V103, and V104.

$Fx = V101 - V103$ $Fy = V102 - V104$ $Fz = V101 + V102 + V103 + V104$

As described above, in the sensor sheet 101 of this embodiment, like the first embodiment, the X-axial component Fx, Y-axial component Fy, and Z-axial component Fz of a force F externally applied to the sensor sheet 101 can be detected by using the voltages V101, V102, V103, and V104 derived from the contact resistance values R101, R102, R103, and R104 respectively corresponding to four detection regions over which one core member 40 is disposed.

Figure 6:
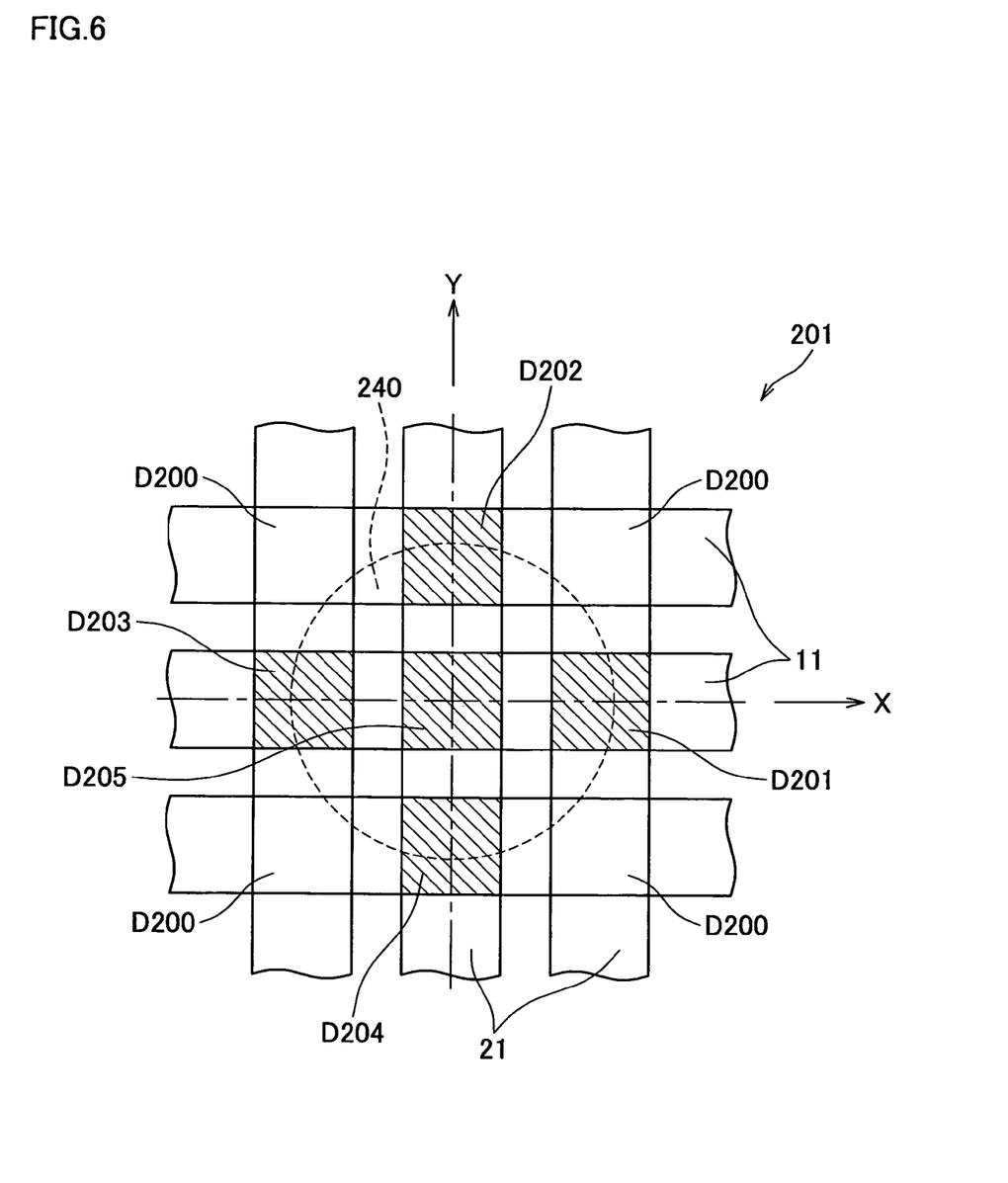
FIG. 6 shows the arrangement of detection regions in a sensor sheet according to a third embodiment of the present invention.

Next, a sensor sheet 201 according to a third embodiment of the present invention will be described with reference to FIG. 6. FIG. 6 shows the arrangement of detection regions in the sensor sheet according to the third embodiment of the present invention.

The sensor sheet 201 of this embodiment differs from the sensor sheet 1 of the first embodiment on the following point. In the case of the sensor sheet 1, the X-, Y-, and Z-axial components of an externally applied force are detected on the basis of changes in resistance value corresponding to four detection regions. In the case of the sensor sheet 201, however, the X-, Y-, and Z-axial components of an externally applied force are detected on the basis of changes in resistance value corresponding to five detection regions. The other features of the construction of the sensor sheet 201 are the same as those of the sensor sheet 1. Therefore, the same components of the sensor sheet 201 as those of the sensor sheet 1 are denoted by the same reference numerals as those of the sensor sheet 1, respectively, and detailed description thereof will be omitted.

In the sensor sheet 201, a construction including five detection regions D201, D202, D203, D204, and D205 and a core member 240 corresponding to the regions serves as one base unit. Here, an X-axis is defined extending along a first electrode 11 in a plan view; a Y-axis is defined extending along a second electrode 21 in the plan view; and a Z-axis is defined extending perpendicularly to the substrate 10. In this coordinate system, five detection regions D201, D202, D203, D204, and D205 are arranged symmetrically with respect to the orthogonal X- and Y-axes in the plan view. In this embodiment, the core member 240 overlaps not only five detection regions D201, D202, D203, D204, and D205 but also four detection regions D200. However, changes in contact resistance corresponding to the four detection regions D200 are not used for force detection.

As shown in FIG. 6, the core member 240 corresponding to the five detection regions D201, D202, D203, D204, and D205 is disposed over the five detection regions D201, D202, D203, D204, and D205. The center of the core member 240 coincides with the center of the five detection regions D201, D202, D203, D204, and D205 in the plan view. Part of the end portion of the core member 240 is inside outer four detection regions D201, D202, D203, and D204 of the five detection regions D201, D202, D203, D204, and D205 in the plan view.

Therefore, when an external force is applied to the sensor sheet 201, the X-, Y-, and Z-axial components of the external force can be detected on the basis of changes in the contact resistance values R201, R202, R203, R204, and R205 between the first and second electrodes 11 and 21 corresponding to the respective detection regions D201, D202, D203, D204, and D205 included in each base unit.

In this embodiment, the contact resistance values R201, R202, R203, R204, and R205 corresponding to the respective detection regions D201, D202, D203, D204, and D205 are converted into voltages V201, V202, V203, V204, and V205 inversely proportional to the magnitudes of external forces. In this case, the X-, Y-, and Z-axial components Fx, Fy, and Fz of a force F applied to the cover layer 31 are given by the following expressions using the voltages V201, V202, V203, V204, and V205.

$Fx = V201 - V203$ $Fy = V202 - V204$ $Fz = V205$ or $Fz = V201 + V202 + V203 + V204$ or $Fz = V201 + V202 + V203 + V204 + V205$

As described above, in the sensor sheet 201 of this embodiment, like the first embodiment, the X-axial component Fx, Y-axial component Fy, and Z-axial component Fz of a force F externally applied to the sensor sheet 201 can be detected by using the voltages V201, V202, V203, V204, and V205 derived from the contact resistance values R201, R202, R203, R204, and R205 respectively corresponding to five detection regions over which one core member 240 is disposed.

Figure 7:
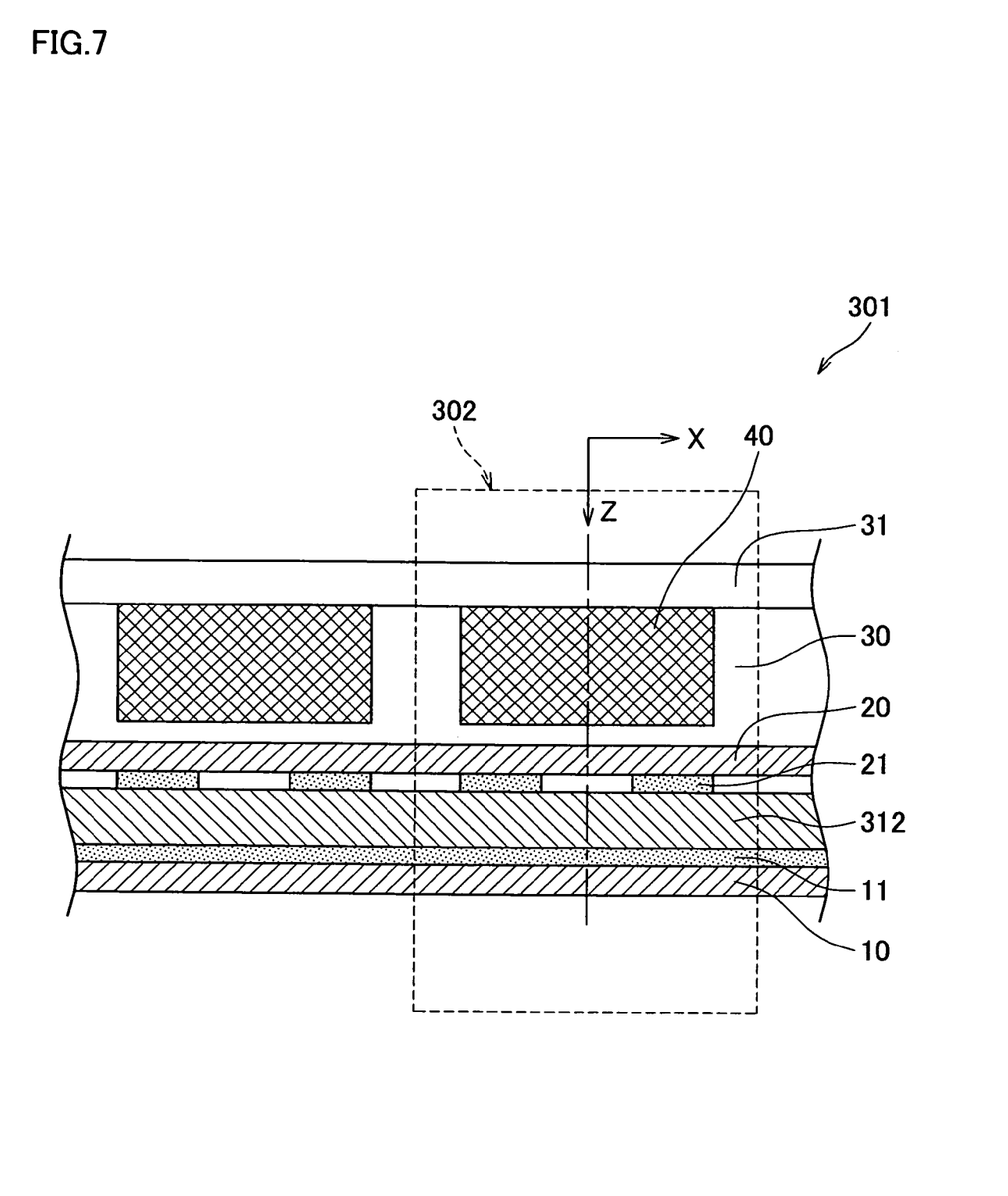
FIG. 7 is a schematic sectional view showing a general construction of the sensor sheet according to a fourth embodiment of the present invention.
Figure 8:
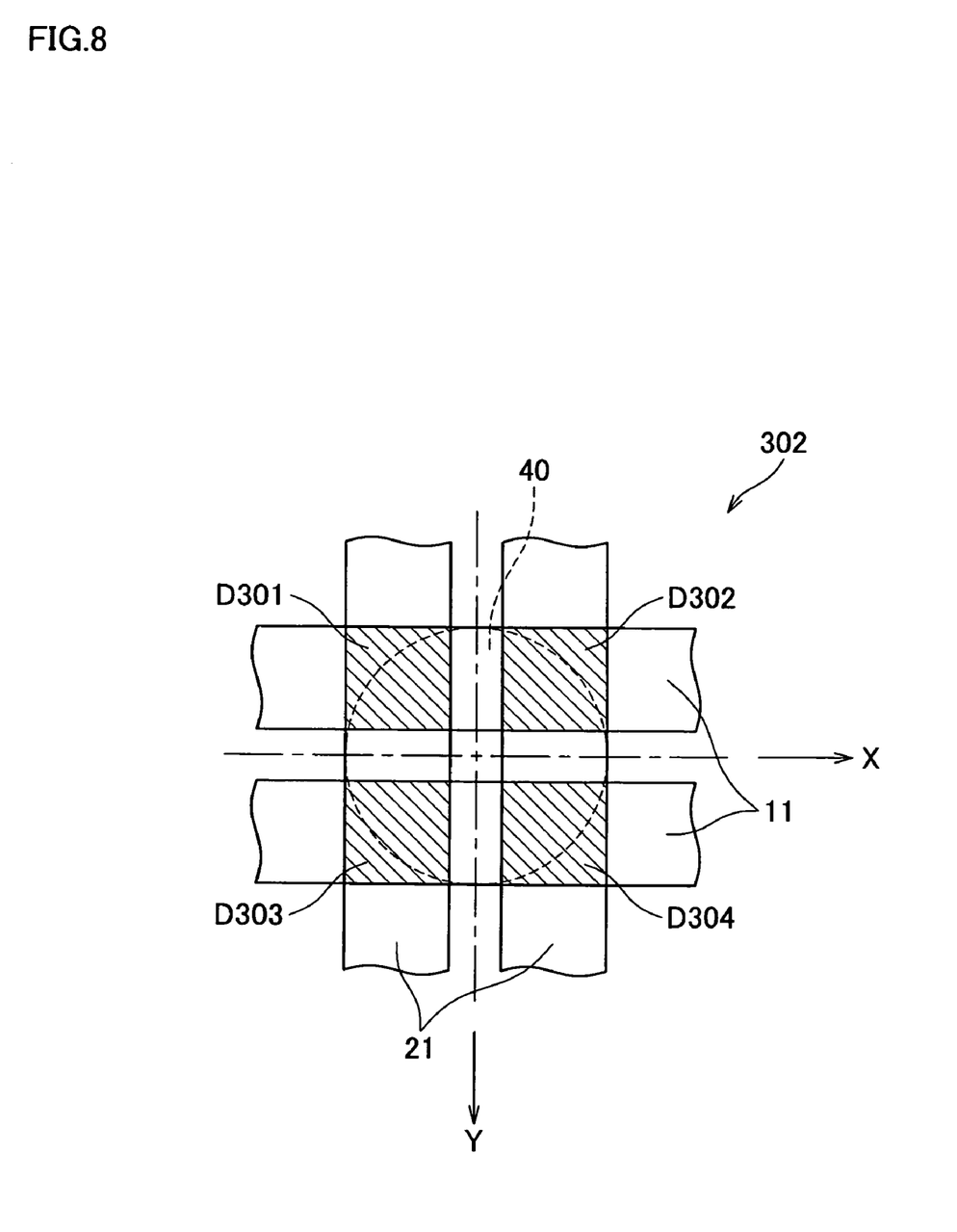
FIG. 8 shows the arrangement of detection regions in the sensor sheet.
Figure 9:
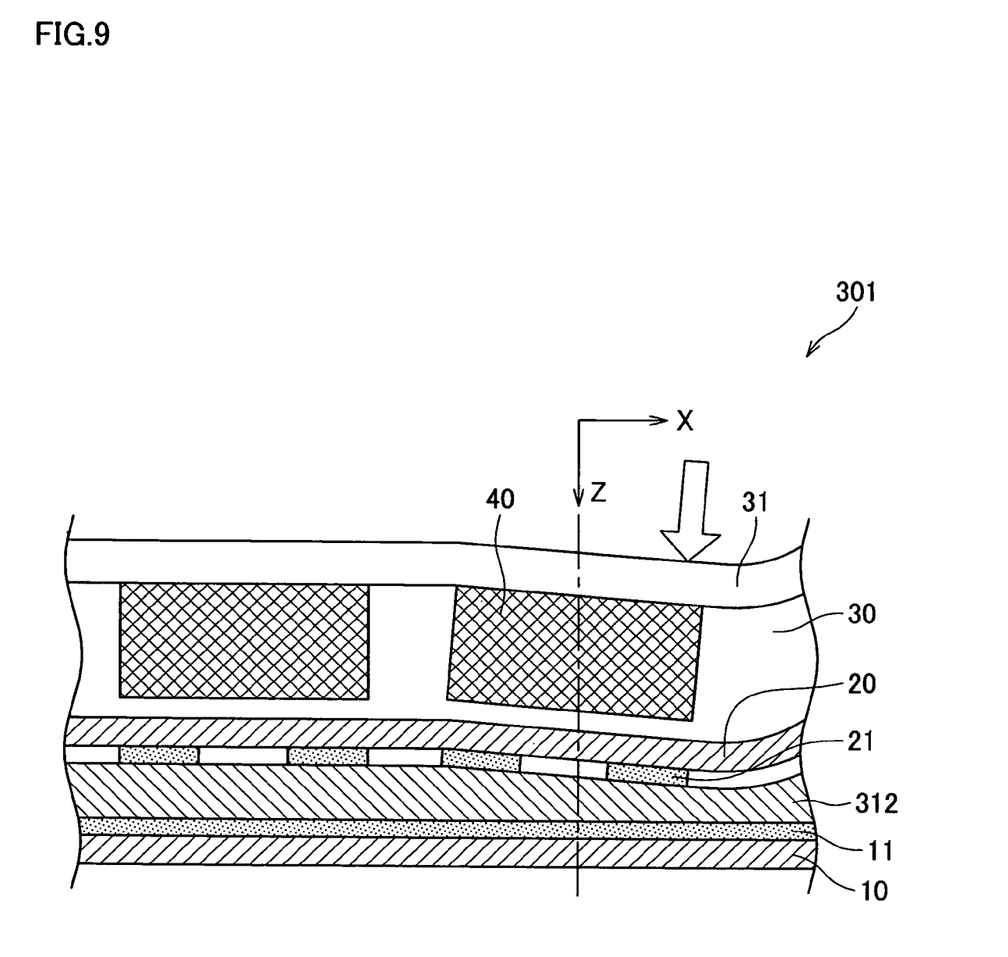
FIG. 9 is a schematic sectional view showing the general construction of the sensor sheet when an external force is applied.

Next, a sensor sheet 301 according to a fourth embodiment of the present invention will be described with reference to FIGS. 7 to 9. FIG. 7 is a schematic sectional view showing a general construction of the sensor sheet according to the fourth embodiment of the present invention. FIG. 8 shows the arrangement of detection regions in the sensor sheet. FIG. 9 is a schematic sectional view showing the general construction of the sensor sheet when an external force is applied.

The sensor sheet 301 of this embodiment differs from the sensor sheet 1 of the first embodiment on the following point.

In the case of the sensor sheet 1, an externally applied force is detected on the basis of changes in the resistance values of the pressure-sensitive resistive members between the electrodes corresponding to the respective detection regions. In the case of the sensor sheet 301, however, an externally applied force is detected on the basis of changes in the capacitance values of capacitance elements between the electrodes corresponding to the respective detection regions. The other features of the construction of the sensor sheet 301 are the same as those of the sensor sheet 1. Therefore, the same components of the sensor sheet 301 as those of the sensor sheet 1 are denoted by the same reference numerals as those of the sensor sheet 1, respectively, and detailed description thereof will be omitted.

As shown in FIG. 7, the sensor sheet 301 includes a substrate 10 on which first stripe electrodes 11 are disposed, and a substrate 20 on which second stripe electrodes 21 are disposed. The substrate 20 is attached to the substrate 10. The sensor sheet 301 further includes a supporting member 30 and a number of columnar core members 40 both disposed above the substrate 20, and a flat uneven cover layer 31 that receives forces externally applied. In any detection region, an insulating member 312, which is made of a soft insulating dielectric material such as silicone rubber, sponge, fabric, or nonwoven fabric, is interposed between the first electrode 11 formed on the upper face of the substrate 10 and the second electrode 21 formed on the lower face of the substrate 20.

In the sensor sheet 301, each portion where a first electrode 11 and a second electrode 21 overlap each other in a plan view serves as a detection region. One lead wire is connected to each first electrode 11. A common drive voltage is supplied to the first electrodes 11 through the respective lead wires. On the other hand, one lead wire is connected to each second electrode 21. The lead wire is connected to a not-shown C/V converter. Therefore, the detection regions disposed on one first electrode 11 serve as a common drive electrode. The second electrodes 21 corresponding to the respective detection regions are connected to separate C/V converters. Thus, the capacitance values between the portions corresponding to the detection regions of the first and second electrodes 11 and 21 can be detected by the C/V converters as voltages.

In the sensor sheet 301, as shown in FIG. 8, a construction including four detection regions D301, D302, D303, and D304 and a core member 40 corresponding to the regions serves as one base unit 302. In the sensor sheet 301, a number of base units 302 are arranged in a matrix. Here, an X-axis is defined extending along a first electrode 11 in a plan view; a Y-axis is defined extending along a second electrode 21 in the plan view; and a Z-axis is defined extending perpendicularly to the substrate 10. In this coordinate system, four detection regions D301, D302, D303, and D304 are arranged symmetrically with respect to the orthogonal X- and Y-axes in the plan view.

Therefore, when an external force is applied to the sensor sheet 301, the X-, Y-, and Z-axial components of the external force can be detected on the basis of changes in the capacitance values of the capacitance elements C1, C2, C3, and C4 between the first and second electrodes 11 and 21 corresponding to the respective detection regions D301, D302, D303, and D304 included in each base unit 302.

Next, a method of detecting the X-, Y-, and Z-axial components of an externally applied force will be specifically described. In this embodiment, the capacitance values of the capacitance elements C1, C2, C3, and C4 corresponding to the respective detection regions D301, D302, D303, and D304 are converted into voltages V301, V302, V303, and V304 proportional to the magnitudes of external forces.

For example, as shown in FIG. 9, when an X-axial positive force Fx, that is, biased in the X-axial positive direction, is applied to the cover layer 31, strong forces are applied to portions corresponding to the detection regions D302 and D304. Therefore, in accordance with the magnitude of the force Fx, the capacitance values of the capacitance elements C2 and C4 increase to increase the voltages V302 and V304. At this time, because forces are scarcely applied to portions corresponding to the detection regions D301 and D303, the capacitance values of the capacitance elements C1 and C3 scarcely change and thus the voltages V301 and V303 also scarcely change.

Likewise, when a Y-axial positive force Fy, that is, biased in the Y-axial positive direction, is applied to the cover layer 31, strong forces are applied to portions corresponding to the detection regions D303 and D304. Therefore, in accordance with the magnitude of the force Fy, the capacitance values of the capacitance elements C3 and C4 increase to increase the voltages V303 and V304.

On the other hand, when a Z-axial positive force Fz is applied to the cover layer 31, forces are evenly applied to portions corresponding to the detection regions D301, D302, D303, and D304. Therefore, in accordance with the magnitude of the force Fz, any of the capacitance values of the capacitance elements C1, C2, C3, and C4 increases to increase any of the voltages V301, V302, V303, and V304.

The following Table 2 shows the above-described relations between the X-, Y-, and Z-axial forces Fx, Fy, and Fz and the voltages V301, V302, V303, and V304.

TABLE 2

| Force | V301 | V302 | V303 | V304 |
|-------|------|------|------|------|
| Fx    |      | +    |      | +    |
| Fy    |      |      | +    | +    |
| Fz    | +    | +    | +    | +    |

In Table 2, symbol "+" indicates that each voltage increases from the value of the state in which no external force is applied to the sensor sheet 301. No symbol indicates that the voltage scarcely changes.

From the above relations, the X-, Y-, and Z-axial components Fx, Fy, and Fz of a force F applied to the cover layer 31 are given by the following expressions using the voltages V301, V302, V303, and V304.

$Fx = (V302 + V304) - (V301 + V303)$ $Fy = (V303 + V304) - (V301 + V302)$ $Fz = V301 + V302 + V303 + V304$

As described above, in the sensor sheet 301 of this embodiment, the X-axial component Fx, Y-axial component Fy, and Z-axial component Fz of a force F externally applied to the sensor sheet 301 can be detected by using the voltages V301, V302, V303, and V304 derived from the capacitance values of the capacitance elements C1, C2, C3, and C4 respectively corresponding to four detection regions over which one core member 40 is disposed.

In the above-described first and second embodiments, directional components of an external force is detected on the basis of changes in resistance value corresponding to four detection regions. In the above-described third embodiment, directional components of an external force is detected on the basis of changes in resistance value corresponding to five detection regions. In the present invention, however, it is only necessary to detect directional components of an external force on the basis of changes in resistance value corresponding to a plurality of detection regions. In a modification, therefore, directional components of an external force may be detected on the basis of changes in resistance value corresponding to two, three, or six or more detection regions.

In the above-described fourth embodiment, four detection regions are in the same arrangement as in the first embodiment. In a modification, however, four detection regions may be in the same arrangement as in the second embodiment. In another modification, five detection regions may be in the same arrangement as in the third embodiment. That is, also in the case of detecting an external force on the basis of changes in the capacitance values of the capacitance elements between the electrodes corresponding to the detection regions, like the case of detecting an external force on the basis of changes in the resistance values of the pressure-sensitive resistive members between the electrodes corresponding to the detection regions, it is only necessary to detect the external force on the basis of changes in capacitance value corresponding to a plurality of detection regions. Further, in the above-described fourth embodiment, the insulating member 312 interposed between the substrates 10 and 20 exists over the whole area including both the portions corresponding to all detection regions and the portions not corresponding to any detection region. In a modification, however, an insulating member may be interposed between the substrates 10 and 20 so as to exist as a spacer only at the portion not corresponding to any detection region. In this modification, a space remains between the substrates 10 and 20 at the portion corresponding to each detection region.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A sensor sheet comprising:
a plurality of first stripe electrodes disposed so as to be distant from each other;
a plurality of second stripe electrodes disposed so as to be distant from each other and intersect with the plurality of first electrodes in a plan view, the plurality of second electrodes being displaceable toward the plurality of first electrodes by a force externally applied;
a plurality of pressure-sensitive resistive elements disposed between the plurality of first electrodes and the plurality of second electrodes at detection regions where the first and second electrodes overlap each other in a plan view; and
a core member made of a hard material and disposed on the opposite side of the plurality of second electrodes from the plurality of first electrodes so as to be over a plurality of detection regions in a plan view,
the sheet detecting different directional components of an externally applied force on the basis of changes in the resistance values between portions of the first and second electrodes corresponding to the plurality of detection regions.

2. A sensor sheet comprising:
a plurality of first stripe electrodes disposed so as to be distant from each other;
a plurality of second stripe electrodes disposed so as to be distant from each other and intersect with the plurality of first electrodes in a plan view, the plurality of second electrodes being displaceable toward the plurality of first electrodes by a force externally applied; and
a core member made of a hard material and disposed on the opposite side of the plurality of second electrodes from the plurality of first electrodes so as to be over a plurality of detection regions where the first and second electrodes overlap each other in a plan view,
the plurality of first electrodes being electrically insulated from the plurality of second electrodes,
the sheet detecting different directional components of an externally applied force on the basis of changes in the capacitance values between portions of the first and second electrodes corresponding to the plurality of detection regions.

3. The sheet according claim 1, wherein four detection regions are disposed symmetrically with respect to two straight lines extending perpendicularly to each other in a plan view.

4. The sheet according claim 2, wherein four detection regions are disposed symmetrically with respect to two straight lines extending perpendicularly to each other in a plan view.

5. The sheet according to claim 3, wherein the center of the core member coincides with the center of the four detection regions in a plan view.

6. The sheet according to claim 4, wherein the center of the core member coincides with the center of the four detection regions in a plan view.

7. The sheet according to claim 3, wherein at least part of an end portion of the core member is inside any of the four detection regions in a plan view.

8. The sheet according to claim 4, wherein at least part of an end portion of the core member is inside any of the four detection regions in a plan view.

9. The sheet according to claim 1, wherein the core member is columnar.

10. The sheet according to claim 2, wherein the core member is columnar.

11. The sheet according claim 1, wherein five detection regions are disposed symmetrically with respect to two straight lines extending perpendicularly to each other in a plan view.

12. The sheet according claim 2, wherein five detection regions are disposed symmetrically with respect to two straight lines extending perpendicularly to each other in a plan view.

13. The sheet according to claim 11, wherein the center of the core member coincides with the center of the five detection regions in a plan view.

14. The sheet according to claim 12, wherein the center of the core member coincides with the center of the five detection regions in a plan view.

15. The sheet according to claim 11, wherein at least part of an end portion of the core member is inside any of four outer detection regions of the five detection regions in a plan view.

16. The sheet according to claim 12, wherein at least part of an end portion of the core member is inside any of four outer detection regions of the five detection regions in a plan view.

17. The sheet according to claim 11, wherein the core member is columnar.

18. The sheet according to claim 12, wherein the core member is columnar.

19. The sheet according to claim 1, wherein units each including the plurality of detection regions and the core member are arranged in a matrix.

20. The sheet according to claim 2, wherein units each including the plurality of detection regions and the core member are arranged in a matrix.

* * * * *